Dec. 31, 1968  SHIGERU HAYAKAWA ET AL  3,419,758
CERAMIC CAPACITOR COMPRISING SEMICONDUCTIVE BARIUM TITANATE
BODY AND SILVER ALLOY ELECTRODES CONTAINING
MINOR AMOUNT OF Cu, Ca OR Bi
Filed Jan. 3, 1966

INVENTORS
SHIGERU HAYAKAWA
HIROSHI IKUSHIMA
TSUNEHARU NITTA
KANEOMI NAGASE
HIROMITSU TAKI
YOSHIO IIDA

BY Wenderoth, Lind
and Ponack
ATTORNEYS

United States Patent Office 3,419,758
Patented Dec. 31, 1968

3,419,758
CERAMIC CAPACITOR COMPRISING SEMICONDUCTIVE BARIUM TITANATE BODY AND SILVER ALLOY ELECTRODES CONTAINING MINOR AMOUNT OF Cu, Ca OR Bi
Shigeru Hayakawa and Hiroshi Ikushima, Hirakata-shi, Tsuneharu Nitta, Kitakawachi-gun, Osaka-fu, Kaneomi Nagase, Kyoto-shi, Hiromitsu Taki, Sakai-shi, and Yoshio Lida, Hirakata-shi, Japan, assignors to Matsushita Electric Industrial Co., Ltd., Osaka, Japan
Filed Jan. 3, 1966, Ser. No. 518,466
3 Claims. (Cl. 317—230)

ABSTRACT OF THE DISCLOSURE

An electrode composition for a ceramic capacitor comprising a semiconductive barium titanate body, consists essentially of 90–99.5% by weight of Ag-Cu, Ag-Cd or Ag-Bi and 0.5–10% by weight of PbO and $Bi_2O_3$, the alloy containing 85 to 99% by weight of silver, has an enhanced capacity per unit area of capacitor. A method of manufacturing the capacitor is also disclosed by air-firing a combination of the ceramic body and applied silver pigment.

---

This invention relates to a novel capacitor whose capacity is due to a p-n heterojunction formed between metal electrode and semiconductive barium titanate ceramic.

The barrier-layer capacitor has an advantage that the capacity is greater than that of the usual insulating ceramic capacitor and its circuit assembly is miniaturized easily by using the capacitor.

The recent electrical devices require higher capacity per unit area, reduced leakage current and lower dissipation factor. Although many efforts have been directed to the concurrent improvement of all these characteristics, entirely satisfactory results have not been obtained with the conventional capacitor comprising semiconductive barium titanate and metal electrodes fired thereon. Especially it has been difficult to obtain ceramic capacitors with reduced leakage current and lower dissipation factor. The problems encountered in the development of the ceramic capacitor provided with the desired characteristics are due to the ambiguity of the origin of capacitive action of the barrier-layer formed at an interface of the ceramic material and metal electrodes.

It is an object of this invention to provide a capacitor comprising semiconductive barium titanate and fired pigment electrodes thereon and having a higher capacity per unit area.

It is another object of the invention to provide semiconductive barium titanate with pigment electrodes characterized by reduced leakage current and lower dissipation factor.

It is a still further object of the invention to provide a method of preparation of semiconductive barium titanate with pigment electrodes characterized by higher capacity per unit area, reduced leakage current and lower dissipation factor.

The invention contemplates, in connection with the capacitive action resulting from a p-n semiconductor heterojunction formed at the interface between electrodes and ceramics, to provide a barrier layer capacitor with considerably higher voltage stability as well as considerably higher insulating resistance.

These and other objects of this invention will become apparent upon consideration of the following description taken together with the accompanying drawings in which.

Figure 1:
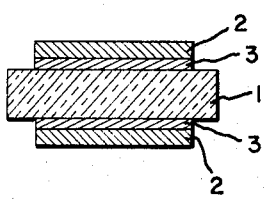
FIG. 1 is a cross-sectional view, on a highly exaggerated scale, of a capacitor produced in accordance with this invention.

The capacitive action is known to be attributed to the depletion layer formed between semiconductor and attached metal whose work function is different from that of the semiconductor. The capacity per unit area is as follows:

$$C = \frac{\epsilon e N_D}{2(V_D + V)} \qquad (1)$$

where $\epsilon$ is a dielectric, constant, $N_D$ is the donor concentration of the semiconductor, $e$ is the electronic charge, $V_D$ is the diffusion voltage, and V is the applied voltage. Equation 1 clearly shows that capacity is dependent on $\epsilon$ and $N_D$. The higher the dielectric constant or donor concentration are, the larger the capacity is. According to the present invention, an increase in $\epsilon$ and $N_D$ does not result in an increase in the capacity of the capacitor comprising semiconductive barium titanate and metal pigment electrode fired thereon.

The metal electrode attached to the semiconductor is usually prepared by firing a silver pigment onto the semiconductor at high temperature. According to the present invention, the firing-on atmosphere is very effective on the capacitive action of the ceramic capacitor; for example, a firing atmosphere of low oxygen content, such as nitrogen atmosphere, inhibits the capacitive action. The capacitive action is promoted when the electrode pigment is fired at a high oxygen partial pressure of firing atmosphere in the temperature range of 600° to 800° C. Therefore, the capacitive action of the ceramic capacitor is clearly related to oxidation during the firing-on process.

Prior literature has disclosed that the semiconductive barium titanate is oxidizable and loses its semiconductivity when it is heated in an oxidizing atmosphere. Accordingly to the prior art, it has been believed that the surface oxidation of semiconductive barium titanate during the air-firing process of the silver pigment is responsible for the formation of a barrier layer at the interface between the semiconductor and metal, and this formation imparts a capacitive action to the ceramic. However, no capacitive action is observed with ceramic material which is air-fired in the same way as that of firing-on pigment, and is then provided with silver electrode by vacuum deposition method. This fact clearly indicates that the air-firing of the ceramic material without silver pigment does not cause the capacitive action and only the air-firing of a combination of ceramic material and pigment appreciably results in the capacitive action. A further important discovery is that the ceramic material has no capacitive action when the material is provided with vacuum deposited silver electrode after an air-fired silver pigment electrode is taken off.

These results indicate that the firing process of the silver pigment imparts to the ceramic material no effect with respect to the formation of capacitive action, that is, the ceramic material hardly oxidizes at the temperature of a firing-on process and there is little hope of thus obtaining an oxide layer capacitor.

According to the present invention, the oxidation of the silver electrode during its firing process is responsible for the capacitive action. The diffusion length of oxygen in silver, under the conditions of a firing-on process, is calculated to be about 100 microns. The greater part of the oxygen dissolved in the silver electrodes evaporates during the cooling process because the solubility of oxygen in silver decreases with decreasing temperature. An electron diffraction pattern indicates that oxygen dissolved in the silver near the interface between silver metal and ceramic material forms silver oxides and more difficultly evaporates than the oxygen near the free surface of silver electrodes. The physical properties of silver oxide are predominantly related to the capacitive action in connection with the partial pressure of oxygen in the atmosphere employed for firing the silver pigment.

Since silver oxide is a p-type semiconductor and semiconductive barium titanate is n-type, the p-n heterojunction may be formed at the interface between them, and this is related to the capacitive action. It has been discovered according to the invention that the capacitive action is strongly promoted by employing an alloy pigment consisting of silver and one metal selected from the group consisting of copper, nickel, cobalt, cadmium and bismuth. These metals are characterized by the fact that their oxides are p-type semiconductors. It is useful for the improvement of the electrical properties of the capacitor that a p-type characteristic of silver oxide formed at the interface be enhanced by an incorporation therein of other metal oxides of p-type semiconductors. No capacitive action, however, is observed with semiconductive barium titanate provided with an electrode, for example of silver-zinc alloy (90 weight percentages of silver and 10 weight percentages of zinc) fired in air.

Referring now to FIG. 1, the disk-shaped n-type semiconductive barium titanate ceramic 1 is provided with silver alloy electrodes 2 by firing-on a silver or silver alloy paste at 600° to 850° C. in air. During the said firing process, the silver or silver alloy partially oxidizes near the interface between the electrodes and the ceramic, and forms silver oxide 3 with or without incorporation of oxide of metal alloyed in the silver.

It is necessary for the formation of a p-n heterojunction that the crystal structure of the p-type and n-type semiconductors have a coherency at the interface between them. The structure of silver oxide is a face centered cubic with the lattice constant of 4.7 A., and that of barium titanate is perovskite cubic. It is well known that barium titanate has an anisotropy in crystal structure. X-ray analysis, however, indicates that the anistropy decreases with an increase in semiconductivity. Therefore, the lattice constant of semiconductive barium titanate is determined to be 4.01 A., similar to the average lattice constant of usual barium titanate. A lattice misfit of crystals is usually defined as $2(\lambda_2-\lambda_1)/(\lambda_2+\lambda_1)$, in which $\lambda_1$, $\lambda_2$ are their lattice constants and $\lambda_2$ is larger than $\lambda_1$. The lattice misfit between silver oxide and semiconductive barium titanate is 16 percentages which is allowable for the epitaxial growth of silver oxide. This epitaxial grain growth results in the formation of p-n heterojunction at the interface between the silver oxide and the semiconductive barium titanate.

An alloy of silver and a high amount of another metal mentioned above is not desirable for use in a pigment electrode because the high amount of such other metal yields an extensive oxidation at the free surface and prevents good electrical or mechanical connection to a soldered lead wire. The following proportions of incorporated metal to silver can be used:

TABLE 1
[Percentages by weight]

| | Operable proportions | Preferable proportions |
| --- | --- | --- |
| Silver | 85–99.9 | 90–99 |
| Metal of the group Cu, Ni, Co, Cd and Bi | 15–0.1 | 10–1 |

The semiconductive barium titanate can be prepared by mixing titanium oxide and barium carbonate in an equimolecular ratio with or without an addition of a small amount of an excess of titanium oxide, pressing into the form of a disc, and sintering at about 1300° to 1400° C. in a non-oxidizing atmosphere. The mixture may be doped with rare earth element oxide and, when desired, may be calcined at 800° to 1000° C. prior to sintering.

It is necessary that the alloy for use in an electrode pigment be in the form of finely divided powder. Alloy powders of desired compositions are prepared by the following methods: (1) alloy cast in the desired composition is divided mechanically into fine powder form by using a stamp mill, air mill or filing machine, and (2) an aqueous solution containing silver ions and desired metal ions in a given proportion is mixed with a solution of sodium carbonate or sodium hydroxide to form a coprecipitate consisting of silver and the metal carbonate or hydroxide. The coprecipitate is dried and heated in hydrogen at 300° to 600° C. to obtain alloy powder. An inorganic binder such as water glass, lead oxide, bismuth oxide, etc. is added to the alloy powder and silver powder. The inorganic binder promotes the adhesion between electrodes and semiconductive barium titanate and the epitaxial grain growth of silver oxide. Good results have been obtained when at least one oxide selected from the group consisting of bismuth oxide and lead oxide is added to alloy powder. The following proportions of added inorganic binder to alloy can be employed:

TABLE 2

| | Operable proportions, percent by wt. |
| --- | --- |
| Alloy | 90 to 99.5 |
| Inorganic binder | 10 to 0.5 |

Alloy powder or silver powder containing inorganic binder are mixed in a pigment paste. The proportion of binder varies widely according to the application to which the ceramic material is to be put.

Figure 2:
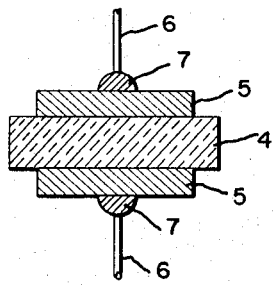
FIG. 2 is an isometric view of a preferred embodiment of the invention.

Referring to FIG. 2, the disk-shaped n-type semiconductive barium titanate ceramic 4 is provided with electrodes 5 at both surfaces of the ceramic by firing silver or silver alloy paste. Lead wires 6 are soldered to the electrodes 6 by a silver-containing adhesive 7 having a high electrical conductivity.

The following example of presently-preferred embodiments is given by way of illustration and should not be construed as limitative. Percentages are by weight.

Example

Semiconductive barium titanate is made in per se conventional manner. Equimolecular mixture of titanium oxide and barium carbonate is wet milled with 0.2% of silver oxide, pressed into tablets 10 mm. in diameter and 3 mm. thick, and sintered at 1380° C. for 2 hours in nitrogen atmosphere. The sintered body, in black color, is 8 mm. in diameter and 2 mm. thick and has 5 ohms of electrical resistance. Various electrode pigments were prepared therewith as listed in Table 3.

Electrode compositions containing copper, cadmium, bismuth, aluminum and zinc is prepared by using alloy powder, the particles of which are 10 to 30$\mu$ in diameter. The alloy powder is prepared by crushing alloy lumps in desired compositions in a per se conventional stamp mill, and by sieving through a mesh. Their particle size is in an order of 100$\mu$. An inorganic binder (listed in Table 3) is added to the alloy powder. The pigment compositions are mixed with conventional organic binder such as polyester to form paste. The thus-prepared pigments are painted on the surfaces of the semiconductive barium titanate and fired at 700° C. in air for 2 hours. Cooling to room temperature (20° to 30° C.) is then carried out in air. Capacity is measured by a per se well-known method, and is shown in Table 3. The pigment containing silver-copper, cadmium or bismuth alloy powders result in a higher capacity than pigment containing only silver. The capacity increases with an increase in amount of copper, cadmium or bismuth up to 5 wt. percent and then decreases. Replacement of alloy pigment such as silver-copper, silver-cadmium or silver-bismuth with a mixture of silver and copper, silver and cadmium or silver and bismuth powders results in no remarkable increase in the capacity. No capacitive action is observed with an electrode of silver-aluminum or zinc alloy. Furthermore, a capacitor with an electrode of silver-copper, silver-cadmium or silver bismuth alloy results in less leakage current than that with an electrode of only silver.

While air is the preferred oxidizing atmosphere, use may be made of an atmosphere which contains from 2 to 100 volume percentages of available oxygen, e.g., a nitrogen-oxygen mixture.

3. A process for preparing a ceramic capacitor having a semiconductvie barium titanate ceramic body comprising coating said body with an electrode pigment consisting essentially of 90 to 99.5% by weight of an alloy selected from the group consisting of silver-copper, silver-cadmium and silver-bismuth and 0.5 to 10% by weight

TABLE 3

| Sample No. | Composition of alloy in weight percentages | | | | | | Weight percentages of solid ingredients of electrode pigment | | | Capacity ($\mu$F/cm.$^2$) at 1 kilocycle | Leakage current ($\mu$A./cm.$^2$) at 15 volts (D.C.) | Dissipation factor (Percent) at 1 kilocycle |
|---|---|---|---|---|---|---|---|---|---|---|---|---|
| | Ag | Cu | Cd | Bi | Al | Zn | Alloy | Inorganic binder | | | | |
| | | | | | | | | Bi$_2$O$_3$ | Pb$_3$O$_4$ | | | |
| 1 | 100 | | | | | | 100 | | | 0.12 | 1.2×10$^3$ | 17.1 |
| 2 | 100 | | | | | | 98 | 0.6 | 1.4 | 0.18 | 4.5×10$^2$ | 8.3 |
| 3 | 99.5 | 0.5 | | | | | 98 | 0.6 | 1.4 | 0.22 | 4.6×10$^1$ | 4.3 |
| 4 | 98 | 2.0 | | | | | 98 | 2.0 | | 0.28 | 2.4×10$^1$ | 2.8 |
| 5 | 98 | 2.0 | | | | | 98 | | 2.0 | 0.31 | 1.8×10$^1$ | 3.2 |
| 6 | 98 | 2.0 | | | | | 98 | 0.6 | 1.4 | 0.42 | 1.1×10$^1$ | 3.0 |
| 7 | 98 | 2.0 | | | | | 94 | 1.8 | 4.2 | 0.45 | 7.0 | 2.6 |
| 8 | 98 | 2.0 | | | | | 92 | 5.6 | 2.4 | 0.49 | 3.4 | 3.8 |
| 9 | 95 | 5.0 | | | | | 94 | 1.8 | 4.2 | 0.65 | 5.0 | 3.6 |
| 10 | 90 | 10.0 | | | | | 94 | 1.8 | 4.2 | 0.56 | 0.3 | 4.2 |
| 11 | 85 | 15.0 | | | | | 94 | 1.8 | 4.2 | 0.48 | 0.1 | 6.5 |
| 12 | 99 | | 1.0 | | | | 94 | 1.8 | 4.2 | 0.58 | 1.4×10$^1$ | 1.8 |
| 13 | 95 | | 5.0 | | | | 94 | 1.8 | 4.2 | 0.57 | 7.6 | 1.8 |
| 14 | 90 | | 10.0 | | | | 94 | 1.8 | 4.2 | 0.50 | 0.8 | 3.8 |
| 15 | 99 | | | 1.0 | | | 94 | 1.8 | 4.2 | 0.26 | 2.0×10$^1$ | 1.9 |
| 16 | 95 | | | 5.0 | | | 94 | 1.8 | 4.2 | 0.62 | 0.3×10$^3$ | 1.8 |
| 17 | 99 | | | | 1.1 | | 94 | 1.8 | 4.2 | | 0.5×10$^4$ | |
| 18 | 90 | | | | 10.0 | | 94 | 1.8 | 4.2 | | 6 ×10$^4$ | |
| 19 | 99 | | | | | 1.0 | 94 | 1.8 | 4.2 | | 5 ×10$^6$ | |
| 20 | 90 | | | | | 10.0 | 94 | 1.8 | 4.2 | | 2 ×10$^6$ | |

What is claimed is:

1. An electrode composition adapted for a ceramic capacitor comprising semiconductive barium titanate, consisting essentially of 90 to 99.5% by weight of an alloy selected from the group consisting of silver-copper, silver-cadmium and silver-bismuth and 0.5 to 10% by weight of at least one oxide selected from the group consisting of lead oxide and bismuth oxide, said alloy being composed of 85 to 99.9% by weight of silver and 0.1 to 15% by weight of metal selected from the group consisting of copper, cadmium and bismuth, and forming oxidic particles upon being fired in an oxidizing atmosphere.

2. A ceramic capacitor comprising semiconductive barium titanate and electrodes including an oxidic silver alloy at surfaces thereof, said electrodes initially consisting essentially of 90 to 99.5% by weight of an alloy selected from the group consisting of silver-copper, silver-cadmium and silver-bismuth and 0.5 to 10% by weight of at least one oxide selected from the group consisting of lead oxide and bismuth oxide, said alloy being composed of 85 to 99.9% by weight of silver and 0.1 to 15% by weight of metal selected from the group consisting of copper, cadmium and bismuth, and being fired on said surfaces.

3. A process for preparing a ceramic capacitor having a semiconductvie barium titanate ceramic body comprising coating said body with an electrode pigment consisting essentially of 90 to 99.5% by weight of an alloy selected from the group consisting of silver-copper, silver-cadmium and silver-bismuth and 0.5 to 10% by weight of at least one oxide selected from the group consisting of lead oxide and bismuth oxide, said alloy being composed of 85 to 99.9% by weight of silver and 0.1 to 15% by weight of metal selected from the group consisting of copper, cadmium and bismuth, and firing said body at 600° C. to 850° C. in an oxidizing atmosphere whose oxygen content ranges from 2 to 100% by volume and then cooling the body to room temperature in said oxidizing atmosphere.

References Cited
UNITED STATES PATENTS

| | | | |
|---|---|---|---|
| 2,583,009 | 1/1952 | Olsen | 317—236 |
| 2,633,543 | 3/1953 | Howatt | 317—258 |
| 2,695,275 | 11/1954 | Gray | 317—258 |
| 2,972,570 | 2/1958 | Haas et al. | 317—258 |
| 3,124,478 | 3/1964 | Cirkler et al. | 317—258 |

JAMES D. KALLAM, *Primary Examiner.*

U.S. Cl. X.R.

29—576; 317—233, 238